Figure 1:
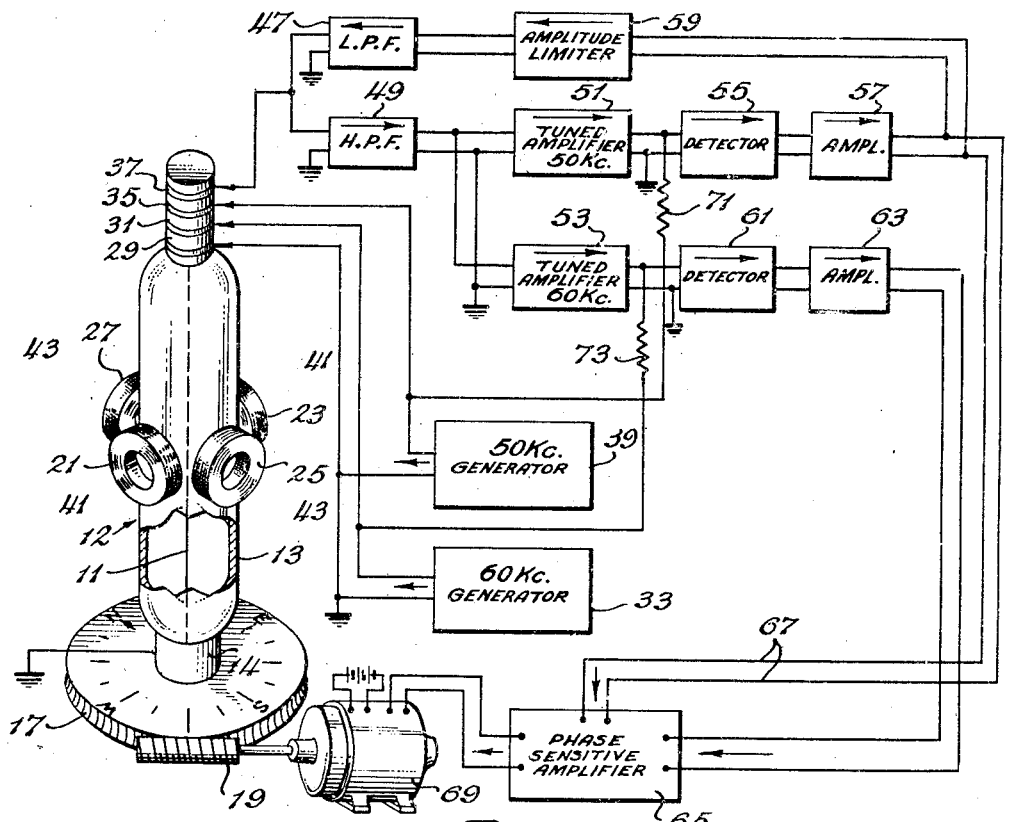

Aug. 23, 1949.  T. M. FERRILL, JR  2,479,562
REFERENCE APPARATUS
Filed Aug. 2, 1946

INVENTOR
THOMAS M. FERRILL, JR.
BY
his ATTORNEY

Patented Aug. 23, 1949

2,479,562

UNITED STATES PATENT OFFICE 2,479,562

REFERENCE APPARATUS

Thomas M. Ferrill, Jr., Hempstead, N. Y., assignor to The Sperry Corporation, a corporation of Delaware Application August 2, 1946, Serial No. 688,156

12 Claims. (Cl. 318—489)

1

The present invention relates generally to stable reference apparatus, and more particularly to vibratory apparatus for establishing a stable orientation reference about a predetermined axis in space.

As set forth in patent application Serial No. 556,186, filed September 28, 1944, by the present inventor, there has heretofore been provided a stable reference system employing a relatively fine gauge strand of elastic material stretched between two points in an evacuated supporting structure, and energized by alternating current passed through the strand at the resonant frequency thereof to produce vibration of the strand transversely of an ambient magnetic field. Capacitor pick-off elements energized by a direct voltage source were provided in that apparatus for producing alternating voltages corresponding to the perpendicular components of vibration of the strand. These perpendicular component voltages were applied to quadrature component resolving directional indicator apparatus such as a "telegon" or a cathode ray oscilloscope, which continuously indicated the direction of vibration of the strand.

The present invention is directed toward provision of an improved system for producing voltages representing predetermined directional components of vibration of a stretched strand, for simplifying construction of the vibratory system and for providing improved isolation between signals representing different components of vibration of the strand.

Moreover, it is an object of the present invention to provide an improved arrangement for sustaining vibration of the strand.

One important object of the present invention is to provide a vibration component detecting system free from a requirement of very close proximity to the strand, and preferably, readily shiftable relative to a strand supporting and enclosing member.

It is yet a further object to provide a vibratory system wherein relatively strong signals due to the vibration of the strand may be amplified and employed to sustain vibration thereof and relatively weak signals representing angular deviations between the plane of vibration of the strand and a predetermined plane in the strand supporting structure may be detected and employed to suppress said deviations, the circuit for the latter purpose being effectively isolated from the vibration sustaining circuit.

In the present invention, a magnetic field is produced along an axis parallel to a line transverse the strand, and employed for generating electromotive forces in the strand during transversely directed vibration thereof. Where the strand is to be motivated by the reactions between an alternating current therethrough and a transverse component of an ambient magnetic field, the electromotive force generating field is

2 an alternating field of frequency different from the frequency of vibration of the strand. Two mutually perpendicular generating fields may be employed at different frequencies, for selective amplification and detection, to provide detector output alternating voltages representing perpendicular components of vibration of the strand. These voltages are usable with a component resolving indicator, or one such voltage may be employed in a vibration-sustaining feedback circuit and the other may be used for operating a reversible servometer for retaining the strand supporting structure substantially fixed in space relative to the plane of vibration of the strand. Greater simplicity of construction of the vibratory strand and support assemblies is provided with these arrangements, and greater flexibility as to the alignment of the detection component axes is also afforded.

My invention might be regarded as a form of compass in that in the preferred form it is self-oriented into the magnetic meridian. It is distinguished, however, from the usual earth inductor compass in that it has no external motive means for rotating or otherwise moving an armature in the earth's field. On the other hand, my invention operates more as a form of electric motor in which the armature (the wire) receives its motivation (vibration maintaining impulses) from the reaction between the earth's field and the current through the wire.

The invention in another of its aspects relates to novel features of the instrumentalities described herein for achieving the principal objects of the invention and to novel principles employed in these instrumentalities, whether or not these features and principles are used for the said principle objects or in the said field.

A further object of the invention is to provide improved apparatus and instrumentalities embodying novel features and principles, adapted for use in realizing the above objects and also adapted for use in other fields.

Figure 2:
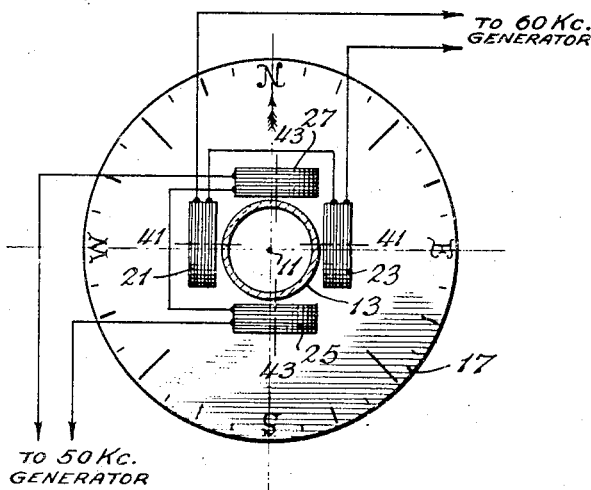

Further objects will become apparent, and the above objects and features will be more fully understood from the following description of an embodiment of the present invention taken in conjunction with the drawing, wherein Fig. 1 is a schematic representation of a vibratory stable reference system shown employed as a stable magnetic compass arrangement, and Fig. 2 is a plan view, partly in section, of the mechanical arrangement of the vibratory element shown in Fig. 1. Like reference characters are used in both figures to denote corresponding parts thereof.

A very fine gauge strand 11, of tungsten or platinum or metalized quartz, is tightly stretched between two points in a supporting structure 12. The supporting structure 12 may include an elongated envelope 13 of a ceramic material such as glass or quartz, provided at its ends with ferrules 14, 15 connected to the opposite ends of the strand 11. Preferably, the arrangement including envelope 13 and ferrules 14, 15 is evacuated so that the gas pressure therein is extremely low, e. g. of the order $10^{-7}$ to $10^{-8}$ mm. Hg. Ferrule 14 is attached to a circular base 17 which is illustrated as engraved with compass rose designations. The supporting structure 12, including portions 13, 14, 15 and 17, may be journaled for rotation about an axis parallel with strand 11, and the base 17 may be provided with gear teeth for engaging a cooperating driving gear element such as a worm 19. A plurality of electromagnetic field directing units such as coils 21 and 23 having their axis aligned transverse the envelope 13 and another pair of coils 25, 27 having their axis aligned transverse both envelope 13 and the axis of coils 21, 23 are arranged on the supporting structure 12 for directing electromagnetic fields along these axes. Coils 21 and 23 are connected together, as shown in Fig. 2, and are connected, as through slip rings 29, 31, to a first alternating voltage generator 33, illustrated as a 60-kilocycle generator. Coils 25, 27 are connected to slip rings 29, 35, shown connected through suitable brushes to a second generator 39 illustrated as a 50-kilocycle generator. With these connections a 60-kilocycle electromagnetic field is maintained along the axis 41-41 of coils 21, 23, while a 50-kilocycle electromagnetic field is maintained along the axis 43—43 of coils 25, 27.

Ferrule 14 is grounded, while ferrule 15 is connected to the output circuit of a low-pass filter 47 and to the input circuit of a high-pass filter 49. The output circuit of the high-pass filter 49 is coupled to the input circuit of an amplifier 51 tuned to 50 kilocycles and also to the input circuit of an amplifier 53 tuned to 60 kilocycles. The output circuit of the 50-kilocycle amplifier is coupled to a detector 55, the output of which is amplified in an amplifier 57 and supplied to the input circuit of the low-pass filter 47, as through an amplitude limiter 59. Such limiter is not absolutely essential, and hence, may be dispensed with if desired. Automatic gain control may be incorporated in amplifier 57, to obviate limiter 59.

The output of the 60-kilocycle amplifier 53 is supplied to a detector 61, and the detected output signals provided thereby are amplified by an amplifier 63 and supplied to the input circuit of a phase sensitive amplifier 65. The phase reference input circuit of the amplifier 65 is connected by conductors 67 to the output circuit of amplifier 51, and the output circuit of the phase sensitive amplifier 65 is connected to a pair of supply terminals such as the field energization terminals of a reversible motor 69 arranged to rotate the worm 19 and thus to control the orientation of the supporting structure 12.

The directional reference apparatus shown in Figs. 1 and 2 is so arranged that a 50-kilocycle signal of appreciable strength is supplied to detector 55 independently of vibration of strand 11 and a 60-kilocycle signal of appreciable strength is similarly supplied to detector 61 independently of vibration of strand 11. The 50-kilocycle signal transfer may be accomplished by the provision of a coupling circuit between generator 39 and detector 55, such as a connection including a resistor 71; and a similar circuit including a resistor 73 may be provided between generator 33 and detector 61. In addition, the axes 41—41 and 43—43 of the electromagnetic induction units may be displaced laterally from the positions of intersection with the strand 11, as is most apparent in Fig. 2. It should be noted, however, that either of these expedients may be employed without the other, provided that sufficient energy is supplied to the detector independently of vibration of strand 11.

A minute vibration of the strand 11 in a direction transverse the axis 43—43 of coils 25, 27 results in the induction in the strand 11 of a component of 50-kilocycle voltage modulated according to the instantaneous speed of movement of the strand in the direction transverse axis 43—43. This modulated 50-kilocycle voltage passes through filter 49, and is amplified by amplifier 51 and rejected by amplifier 53. The resulting output of amplifier 51, along with the 50-kilocycle voltage component independent of strand vibration, is detected in detector 55 and amplified in unit 57 and passed through unit 59 and low-pass filter 47 and applied through slip ring 37 to the strand 11, so that a current is developed in the strand 11 varying in accordance with the modulation of the 50-kilocycle signal induced in strand 11. The output signal from the low-pass filter 47 is so sensed as to provide regenerative action in the earth's magnetic field, and thus to cause the vibration of the strand 11 to increase until the amplitude limiter 59 so controls the voltage applied to the strand 11 as to prevent further increase thereof.

Thus, through the cooperation of generator 39, coils 25 and 27, and units 49, 51, 55, 57, 59 and 47, the strand 11 is made to vibrate in the vertical plane perpendicular to the north-south magnetic meridian, i. e., to vibrate in the east-west vertical plane.

Ordinarily, the movement of the middle portion of strand 11 is substantially parallel to the axis 41—41 of coils 21, 23 so that no modulated 60-kilocycle voltage is induced in the strand 11 by these coils. However, if the body or craft supporting motor 69 and pivotally supporting the unit 12 commences to turn about the vertical axis, tending to cause a divergence between axis 41—41 and the east-west direction, a modulated 60-kilocycle signal component is induced in the strand 11 because of the persistence of vibration thereof in the east-west direction, and hence in a direction now tending toward non-parallelism with coil axis 41—41. This 60-kilocycle signal is passed through filter 49 and amplified in unit 53 and detected in unit 61. The output of unit 61 is an alternating voltage of the frequency of vibration of strand 11 and of phase relative to the phase of output voltage of detector 55 dependent upon the direction of departure of axis 41—41 from the east-west direction. This voltage is amplified in an amplifier 63 and is supplied to the principal input circuit of the phase sensitive amplifier 65, which supplies to the field circuit of motor 69 a direct output voltage of polarity depending on the relative phase of the outputs of units 57 and 63, and of strength dependent upon the strength of the signals supplied by amplifier 63. Motor 69 accordingly is operated in the direction to restore the axis 41—41 of coils 21, 23 directly to the east-west direction. Thus, units 53, 61, 63, 65 and 69 operate to retain the base 17 of the supporting structure 12 rigidly fixed in space about the vertical axis in accordance with the direction of vibration of the strand 11.

Because the directional energy stored in strand 11 is extremely high in comparison to the energy supplied per cycle of vibration thereof, the plane of vibration of strand 11 tends to remain fixed in space throughout an appreciable time even when the direction of the ambient magnetic field component perpendicular to the strand appears to be appreciably shifted relative to the perpendicular to the plane of vibration of the strand, as due to an appreciable inclination of the supporting structure 12 of short duration, where the system is operated in a magnetic latitude of relatively steep flux inclination, as in the northern or central regions of the United States. Accordingly, the vibratory strand 11 serves not only as a direction determining element, but also as a stabilizing or integrating medium such that its vibratory reference plane tends to remain in a predetermined direction by virtue of its stored energy, for an appreciable time after the vibration-producing force direction is shifted from normal relation thereto. Thus, the reference apparatus illustrated in Figs. 1 and 2 corresponds in its performance to a combination of a magnetic field sensitive instrument and a stabilizing instrument, e. g., to a directional gyroscope "slaved" by a flux valve, or a gyro-magnetic compass.

While the present invention has been illustrated as employed for providing a stable reference about a vertical axis, and more particularly, for providing a stable reference about a vertical axis in predetermined relation to the horizontal component of the earth's magnetic field, it will be readily apparent that the directional component determining features and vibration sustaining features of the present invention are readily usable in other arrangements, as for example, where the ambient magnetic field for sustaining vibration is provided by a local magnetic system, whether the strand is normally aligned vertically or horizontally.

An important advantage achieved in the use of the electromagnetic direction component system is the improved flexibility achieved therewith. It is readily apparent that the coil units 21, 23, 25 and 27 normally fixed to the envelope 13 readily may be disengaged from the outer surface of the envelope and may be turned about the envelope to another desired orientation. This is a particularly important feature where extremely high precision is required, since the preferred plane of vibration of the strand due to any imperfections of the strand or the supporting structure may be determined after assembly and evacuation, and then the coils 21, 23, 25 and 27 may be fixed in the orientation required for normal operation of the strand in its preferred plane of vibration. Thus, the present invention lends itself readily to use in a system of the type described in a patent application filed concurrently herewith by A. L. Rawlings, Serial No. 688,160 for Vibratory stable reference apparatus, disclosing and claiming the features of preferred-plane operation of vibratory elements.

The employment of the tuned electromagnetic vibration component detection system of the present invention permits very high-gain amplification of the voltages representing the components of vibration of the strand. Furthermore, ideal isolation between these components is maintained through the high selectivity achieved through the use of frequency-selective amplifier and detector stages. This is particularly helpful where one component voltage is detected and amplified and employed to actuate motive apparatus for so controlling the orientation of the strand supporting structure and electromagnetic field units as to suppress that component voltage.

Since many changes could be made in the above construction and many apparently widely different embodiments of this invention could be made without departing from the scope thereof, it is intended that all matter contained in the above description or shown in the accompanying drawings shall be interpreted as illustrative and not in the limiting sense.

What is claimed is:

1. In vibratory strand directional reference apparatus, a directional component vibration detection system comprising means for maintaining an alternating magnetic field along an axis parallel to a line transverse said strand at a predetermined frequency different from the frequency of vibration of said strand, frequency-selective means coupled to said strand and responsive to signals induced therein at said predetermined frequency for amplifying and detecting the induced signals to provide an output signal varying in accordance with the component of movement of said strand in a direction transverse said axis, said magnetic field maintaining means and said last-named means being coupled to a predetermined extent for transfer therebetween of energy at said predetermined frequency independently of vibration of said strand, whereby opposite movements of said strand in the direction transverse said axis produce opposite variations of strength of the detected signals and hence produce a detector output signal of frequency and phase corresponding to the frequency and phase of transverse component vibration of the strand.

2. In vibratory strand directional reference apparatus, a directional component vibration detection system defined in claim 1, wherein said magnetic field maintaining means is so positioned relative to said strand as to fix said magnetic field axis at a predetermined displacement from the neutral position of said strand, whereby said magnetic field maintaining means and said amplifying and detecting means are intercoupled by induction in said strand in the absence of a vibration component in a direction transverse said axis.

3. In vibratory strand directional reference apparatus, the directional component vibration detection system defined in claim 1, wherein said magnetic field maintaining means is coupled to said amplifying and detecting means independently of said vibratory strand.

4. Vibratory strand directional reference apparatus comprising a support, a vibratory strand stretched between two points therein, means for vibrating said strand in a plane at a predetermined frequency, means for maintaining a first alternating magnetic field along an axis parallel to a first line transverse said strand at a first frequency different from the frequency of vibration of said strand, means for maintaining a second alternating magnetic field along an axis parallel to a second line transverse both said strand and said first line at a second frequency different from both said first frequency and the frequency of vibration of said strand, first frequency selective means coupled to said strand and responsive to signals induced in said strand at said first frequency for amplifying and detecting the first-frequency induced signals to provide a first output signal varying in accordance with the component of movement of said strand perpendicular to said first line, and second frequency selective means coupled to said strand and responsive to signals induced in said strand at said second frequency for amplifying and detecting the second-frequency induced signals to provide a second output signal varying in accordance with the component of movement of said strand perpendicular to said second line, whereby the relative variations of said first and second output signals represent the respective perpendicular components of vibration of said strand.

5. Vibratory strand directional reference apparatus as defined in claim 4, wherein said first alternating magnetic field maintaining means is coupled to said first amplifying and detecting means to a predetermined extent for transfer therebetween of energy at said first frequency independently of vibration of said strand, and said second alternating magnetic field maintaining means is coupled to said second amplifying and detecting means to a predetermined extent independently of vibration of said strand, whereby the alternate movements of said strand in opposite directions during vibration thereof produce opposite changes of strength of the detected signals and hence produce detection output voltage components of the frequency of vibration of said strand.

6. Stable reference apparatus comprising a supporting structure, a strand of elastic material stretched between two points in said supporting structure for vibration therein at a resonance frequency determined by the tension and mass and length of said strand between said two points, means for producing an alternating electromagnetic field directed along an axis parallel to a line transverse said strand at a predetermined frequency different from said resonance frequency, frequency selective means coupled to said strand and responsive to signals induced in said strand at said predetermined frequency for amplifying and detecting said induced signals and providing a detected output signal version, said output signal version being characterized by time variations according to movements of said strand in said field, and means coupled to said last-named means and responsive to said detected output signal version for producing alternating forces vibrating said strand in said field in accordance with the modulation of said output signal version.

7. Stable reference apparatus comprising a supporting structure, a strand of elastic material stretched between two points in said supporting structure for vibration therein at a resonance frequency determined by the tension and mass and length of said strand between said two points, means for producing an alternating electromagnetic field directed along an axis parallel to a line transverse said strand at a predetermined frequency different from said resonance frequency, means coupled to said strand and responsive to signals induced in said strand at said predetermined frequency for detecting said induced signals and providing a detected output signal version, said output signal version being characterized by time variations according to movements of said strand in said field, and means coupled to said last-named means and responsive to said detected output signal for variably rotating said field producing means about said strand according to the time variations of said output signal version.

8. Stable reference apparatus comprising a supporting structure, a strand of elastic material stretching between two points in said supporting structure for vibration therein at the frequency of mechanical resonance, means fixed to said supporting structure for maintaining a first alternating magnetic field directed along an axis parallel to a first line transverse said strand at a first frequency different from the resonance frequency of said strand, means fixed to said supporting structure for maintaining a second alternating magnetic field directed along an axis parallel to a second line transverse both said strand and said first line and at a second frequency different from both said resonance frequency and said first field frequency, first frequency selective means coupled to said strand and responsive to signals induced in said strand at said first field frequency while rejecting signals induced therein at said second field frequency and said vibration resonance frequency for amplifying and detecting said first-frequency induced signals, second frequency selective means coupled to said strand and responsive to signals induced in said strand at said second field frequency while rejecting signals induced therein at said first field frequency and said vibration resonance frequency for amplifying and detecting said second-frequency induced signals, means responsive to said means for amplifying and detecting said second-frequency induced signals for sustaining vibration of said strand at the frequency of modulation of said second-frequency induced signals, and means coupled to said means for amplifying and detecting said first-frequency induced signals for varying the space orientation of said supporting structure according to variation of said first-frequency induced signals.

9. Apparatus as defined in claim 8, wherein said last-named means is coupled to said means for amplifying and detecting said second-frequency induced signals and is jointly responsive to the detected output signals from both said amplifying and detecting means for varying the space orientation of said supporting structure in a direction determined by the relative phase of outputs of said amplifying and detecting means.

10. A magnetic compass comprising spaced holders, a wire stretched therebetween and adapted to be mounted in a normally vertical position, a pair of windings arranged about said wire between said holders and located in quadrature, a motor for orienting said windings in azimuth, means for energizing each winding at different frequencies, a pair of filtering networks in the output from said wire as it vibrates in the earth's field, said networks being selective to pass two different frequencies, and phase sensitive means connected to the output of both filtering networks for driving said motor in either direction to maintain the plane of vibration of said wire E-W.

11. A compass as claimed in claim 10 also having a feedback to the wire for maintaining the vibration of said wire in the earth's field at its natural frequency.

12. A compass as claimed in claim 10 in which said selective networks are tuned to reject signals of the natural frequency of vibration of said wire.

THOMAS M. FERRILL, JR.

REFERENCES CITED

The following references are of record in the file of this patent:

UNITED STATES PATENTS

| Number | Name | Date |
|---|---|---|
| Re. 22,409 | Lyman et al. | Dec. 21, 1943 |